United States Patent [19]

Luppi

[11] 4,059,530
[45] Nov. 22, 1977

[54] DIALYZER CARTRIDGE OF ROLL TYPE PARTICULARLY FOR EXTRACORPORAL ARTIFICIAL KIDNEYS

[76] Inventor: Libero Luppi, Viale Martiri, 13, Mirandola (Modena), Italy

[21] Appl. No.: 565,506

[22] Filed: Apr. 7, 1975

[30] Foreign Application Priority Data

Apr. 10, 1974 Italy .................................. 21235/74

[51] Int. Cl.² ............................................ B01D 31/00
[52] U.S. Cl. ............................. 210/321 B; 210/494 M
[58] Field of Search ................................. 210/321, 494

[56] References Cited

U.S. PATENT DOCUMENTS

| 3,077,268 | 2/1963 | Gobel et al. ...................... 210/494 X |
| 3,687,293 | 8/1972 | Carter ............................... 210/321 B |
| 3,709,367 | 1/1973 | Martinez ............................. 210/321 |
| 3,753,712 | 8/1973 | Janneck et al. ................... 210/321 X |
| 3,960,730 | 6/1976 | Miller .......................... 210/494 M X |

FOREIGN PATENT DOCUMENTS 1,217,044 12/1970 United Kingdom ................. 210/321

*Primary Examiner*—Frank A. Spear, Jr.
*Attorney, Agent, or Firm*—Guido Modiano; Albert Josif

[57] ABSTRACT

A dialyzer cartridge of roll type particularly suitable for artificial kidneys, comprising two layers of strip form facing each other and a dialyzing membrane arranged between the layers. The layers and the membrane are wound in spiral form. The layers are provided with projections uniformly distributed thereon and defining top portions which are mutually aligned over the surface of the layers. Grooves are defined between the projections to allow the passage of a dialyzing liquid, the grooves of the first layer forming an angle with the grooves of the second layer such that the two facing layers contact by interposition of the membrane only on a part of the top portions of the projections, thus avoiding embedding of the layers and obstructions for the passage of the dialyzing liquid.

7 Claims, 9 Drawing Figures

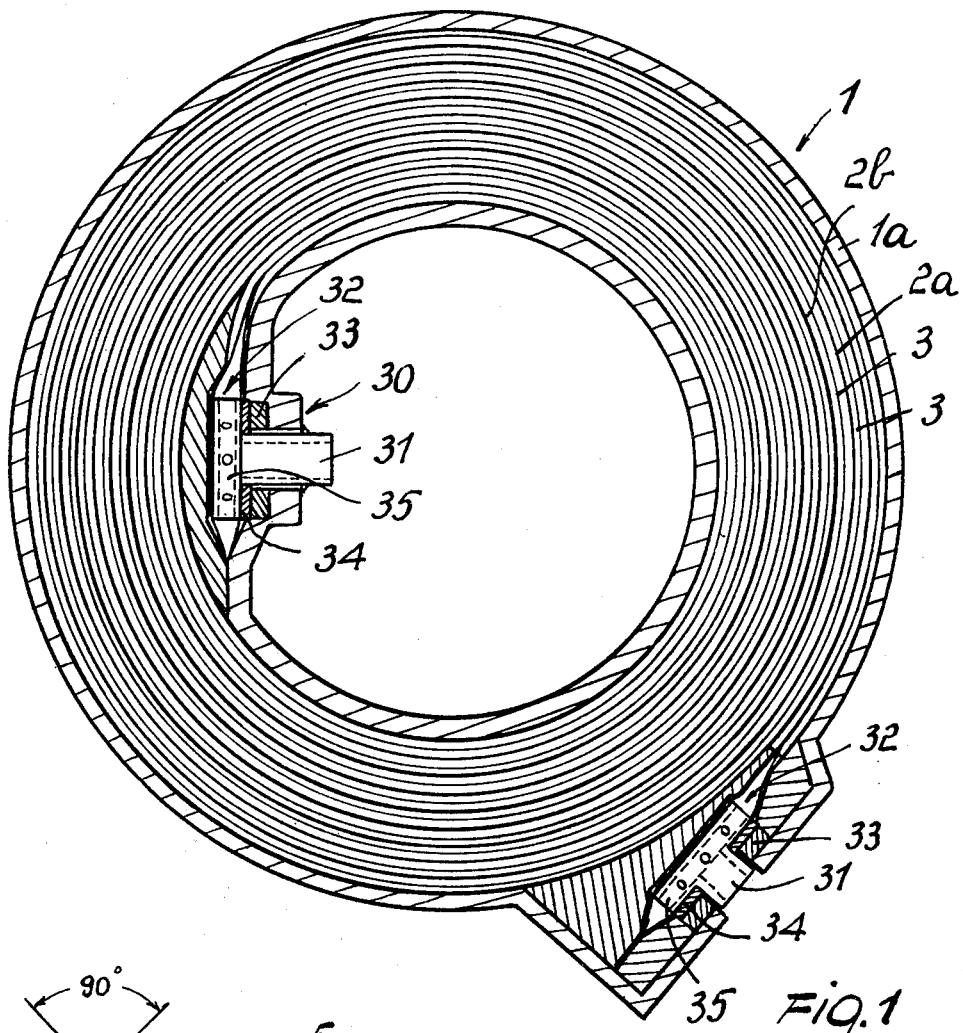
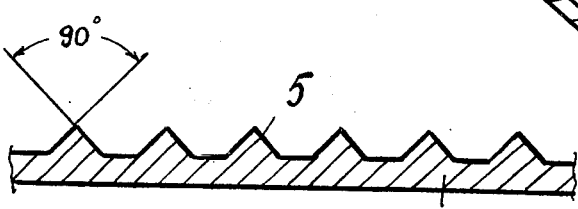
Fig. 7
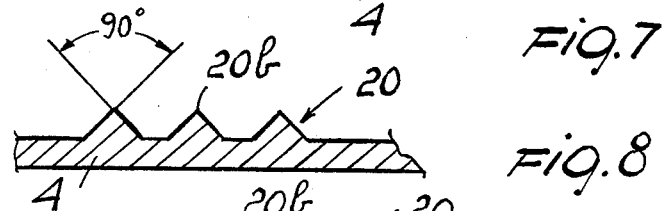
Fig. 8
Fig. 9

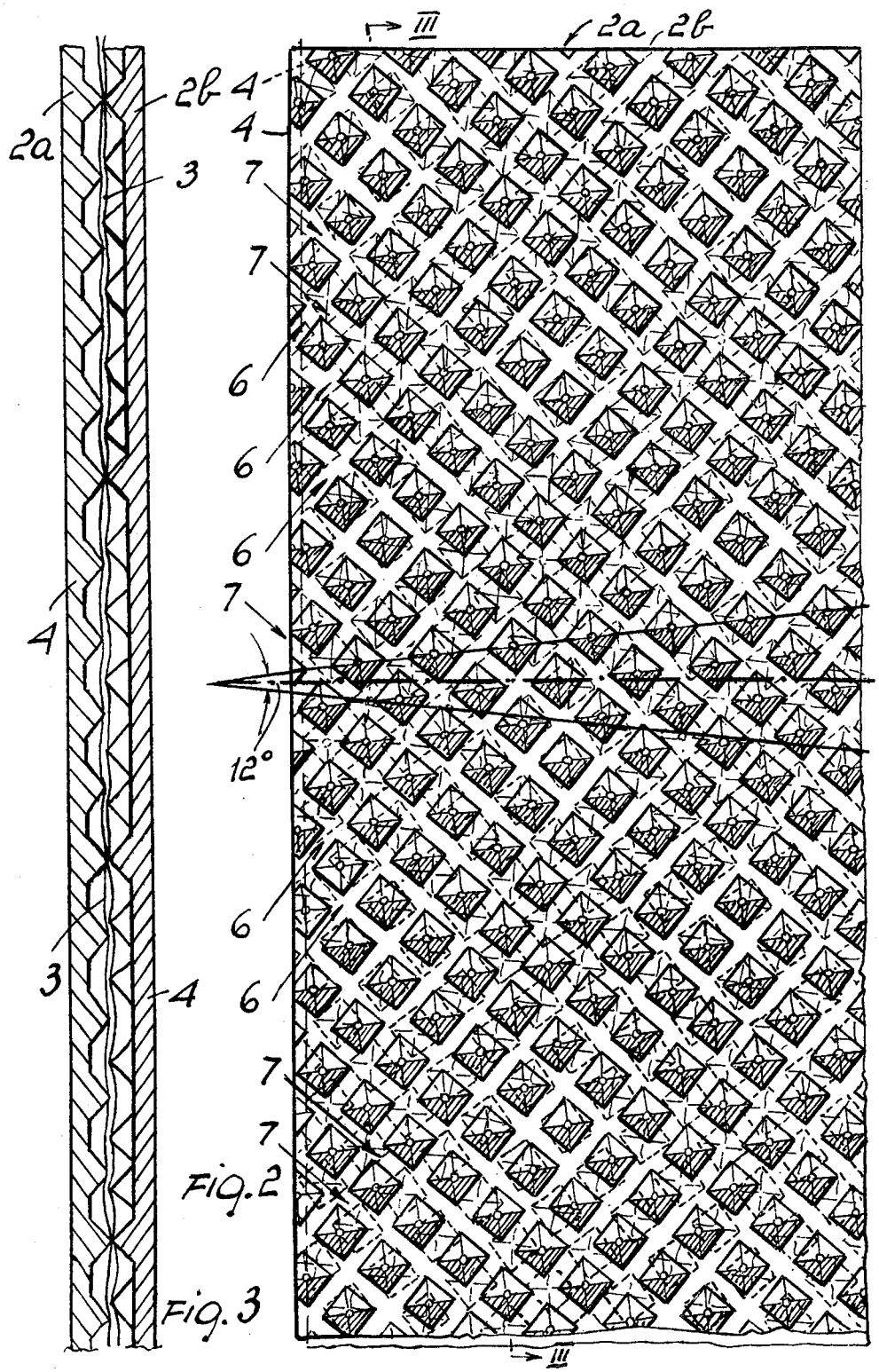

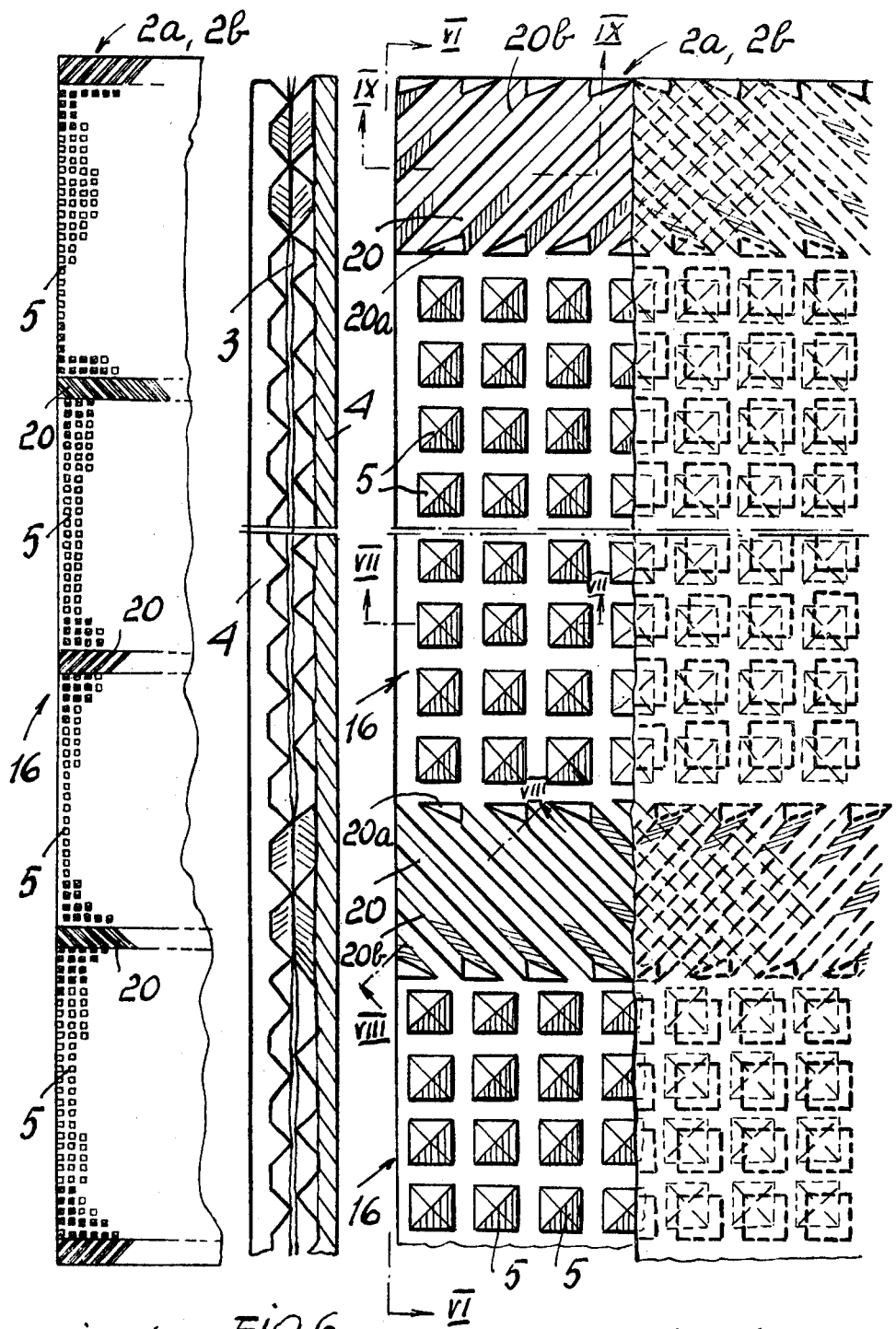

DIALYZER CARTRIDGE OF ROLL TYPE PARTICULARLY FOR EXTRACORPORAL ARTIFICIAL KIDNEYS

BACKGROUND OF THE INVENTION

This invention relates to a dialyser cartridge of roll type particularly for extracorporal artificial kidneys.

Dialyser cartridges of plate type are presently known, comprising a first and second support layer facing each other and extending in a plane. Between said first and second layer a dialyser membrane is disposed, through which the blood to be dialysed is passed. In these known types, projections in the form of square-based pyramidal elements are uniformly distributed over the facing surfaces of the first and second support layer. The purpose of the projections or projecting elements is to assist uniform distribution of the dialysing liquid which is passed in contact with the outer surface of the dialysing membrane for achieving dialysis of the blood.

Dialyser cartridges of roll type were subsequently introduced, in which the membrane support layers are spirally wound and contained in an outer casing generally of cylindrical shape. The use of support layers with square-based pyramidal elements disposed specularly one to the other has not however been possible in cartridges of roll type, because the facing pyramidal elements of two wound layers inevitably become mutually embedded, with consequent obstruction of the passage zone for the dialysing liquid. To obviate this disadvantage various designs have been introduced, in which the facing surfaces of the two support layers in dialyser cartridges of roll type have been formed and shaped in various ways. Although having given satisfactory results, the designs adopted have however not always proved able to give that uniformity of distribution of the dialysing liquid which is obtainable with flat support layers comprising projections in the form of square-based pyramids.

SUMMARY OF THE INVENTION

One object of the present invention is to eliminate the aforesaid disadvantages by providing a dialyser cartridge of roll type in which support layers are used comprising projections in the form of square-based pyramids on their facing surfaces, while avoiding any possibility of mutual embedding of the pyramidal elements of the two facing layers.

A further object of the present invention is to provide a dialyser cartridge of roll type in which the support layers, while giving uniform distribution of the dialysing liquid, can in no way obstruct the flow of the blood to be dialysed.

A further object of the present invention is to provide a dialyser cartridge of roll type the support layers of which are easy to make and at the same time are completely reliable in their operation.

These and further objects which will be more evident hereinafter are attained by a dialyser cartridge of roll type particularly for extracorporal artificial kidneys, comprising an outer casing, a support element wound inside said outer casing, said support element consisting of a first and second support layer of strip form disposed facing each other, a flattened tubular dialyser membrane disposed between said first and second support layer of strip form and extending over the entire length of said layers, and further comprising, on the opposing faces of said layres, projections uniformly distributed over said layers and having top portions in mutal longitudinal and transverse alignment, said projections defining longitudinal and transverse grooves on said layers, said longitudinal grooves on said first layer forming an angle with said longitudinal grooves on said second layer such that only a part of said top portions of said first and second layer are in mutual contact by interposition of said membrane.

BRIEF DESCRIPTION OF THE DRAWINGS

Further characteristics and advantages will be more evident from the description of some preferred but not exclusive embodiments of a dialyser cartridge of roll type particularly for extracorporal artificial kidneys, illustrated by way of non-limiting example with the aid of the accompanying drawings in which:

FIG. 1 is a diagrammatic section on a plane perpendicular to the axis of the outer casing, of a dialyser cartridge of roll type;

FIG. 2 is a diagrammatic illustration to an enlarged scale of two mutually facing, superimposed layers;

FIG. 3 is a section on the line III—III of FIG. 2;

FIG. 4 is a diagrammatic illustration of a further embodiment of the support layer of strip form;

FIG. 5 is an enlarged view of part of a layer of FIG. 4, in which two mutually facing superimposed layers are diagrammatically represented by dashed lines;

FIG. 6 is a section on the line VI—VI of FIG. 5;

FIG. 7 is a section on the line VII—VII of FIG. 5;

FIG. 8 is a section on the line VIII—VIII of FIG. 5 and

FIG. 9 is a section on the line IX—IX of FIG. 5.

DESCRIPTION OF THE PREFERRED EMBODIMENT

With reference to said figures, the dialyser cartridge of roll type 1 comprises an outer casing 1a in the form of a hollow tubular cylindrical box element, the inner and outer surfaces of the casing comprising ports which will be further described hereinafter.

Inside the outer casing 1a is situated a spirally wound web-like support element consisting of a first portion of strip or sheet form 2a on which is superimposed a facing second portion of strip form 2b. Between the layer or web portion 2a and layer or web portion 2b is placed a flattened tubular dialyser membrane 3 which extends over the entire length and width of said layers 2a and 2b.

Each layer or web portion 2a and 2b comprises a base layer or web 4 which, on those faces of the sheet portion which are adjacent to the dialyser membrane 3, comprises uniformly distributed projections consisting of regular square-based pyramidal elements 5. Said pyramidal elements are mutually spaced and aligned longitudinally and transversally, so as to define spaces between them defining longitudinal grooves or channels 6 and transverse grooves 7 disposed mutually perpendicular. The vertices of the aligned tooth-like or pyramidal projections lie on center lines or directional lines parallel to grooves 6 and 7.

On the first layer 2a, said longitudinal grooves 6 form an angle with respect to the longitudinal extension of said first layer in a direction opposite to that formed by the longitudinal grooves 6 on the second layer 2b. Thus an angle is formed between the longitudinal grooves of the first layer and the longitudinal grooves of the second layer. As experimental tests have shown, this angle prevents the pyramidal elements 5 of the first web portion becoming embedded in the spaces between pyramidal elements 5 of the second facing web portion and vice versa. This is because the described relationship between the longitudinal grooves of the first web portion and those of the second web portion causes the vertices of a number of pyramids of the first web portion to contact with the vertices of pyramids of the second web portion, so preventing mutual embedding between the facing web portion. Experimental tests have shown that the number of points of contact, and thus the distance between them, is a function of the relative angle between the longitudinal grooves 6 of the first web portion and the longitudinal grooves 6 of the second web portion. Furthermore it has been found that optimum results are obtained when an angle of 12° is formed between the longitudinal grooves of the two web portion. Uniform distribution of the dialysing liquid is obtained when the longitudinal grooves of the first web portion form an angle of 6° with respect to the longitudinal extension of the web itself, while the longitudinal grooves of the second web portion form an angle of 6° in the opposite direction with respect to the longitudinal development of the second web portion, so that an angle of 12° is formed between the longitudinal grooves of the two layers.

To increase the length of the dialysing liquid path and to improve thereby the contact between the dialysing liquid fed axially into said casing 1a and the membrane 3 supported by the layers 2a and 2b, it has been found that said longitudinal grooves 6 may be disposed, (as illustrated in FIG. 2) so that they form an angle close to 45° with respect to the extension of the layers. More precisely, the longitudinal grooves 6 of the first layer form an angle close to, but less than 45° with the longitudinal development of the first layer, while the longitudinal grooves of the second layer form an angle close to, but greater than 45° with the longitudinal extension of the second layer. To obtain the optimum result, the longitudinal grooves 6 of the first layer 2a again form as previously described, an angle of 12° with the longitudinal grooves 6 of the second layer 2b.

In a further embodiment illustrated in FIGS. 4 to 9, each of the layers 2a and 2b, which are similar, comprises projecting elements consisting of regular pyramidal elements 5 with their lateral opposing faces disposed at 90° to each other, and uniformly distributed in bands 16 which extend longitudinally over each of said layers 2b. In this embodiment the pyramidal elements 5 are again aligned longitudinally and transversally on said layers 2a and 2b.

On those faces of the layers 2a and 2b in contact with the dialysing membrane 3 there are further projections consisting of essentially pyramidal elements 20 each having a base elongated in a direction inclined to the longitudinal development of said bands 16. More precisely, the essentially pyramidal elements 20 comprise a rhomboidal base with its short sides 20a in a direction parallel to the extension of said bands 16. The vertex of the elements 20 consists of a sharp ridge 20b disposed parallel to the lengthwise extension of the base of the elements 20.

The pyramidal elements 20, preferably inclined at 45° to the development of said bands 16, are disposed in a side by side arrangement and in longitudinal alignment with the development of the bands 16. If a section is taken through the elements 20 along a direction perpendicular to their extension, the lateral major faces of the elements appear disposed mutually perpendicular.

Said elements 20, disposed as heretofore described, alternate with the bands 16 on which the pyramidal elements 5 are disposed. Furthermore each group of elements 20 is inclined in the opposite direction to the subsequent group of elements 20.

To increase the contact zone between the dialysing liquid and dialysing membrane 3 said bands 16, which in the previously described embodiment are disposed longitudinally with respect to the longitudinal extension of the layers 2a and 2b, may again be inclined at an angle of 45° to the extension of the layers.

In this embodiment the presence of the essentially pyramidal elements 20, which on the mutually facing layers 2a and 2b are inclined in opposite directions, prevents the square-based pyramidal elements 5 from becoming mutually embedded when the layers 2a and 2b are wound, and they also serve to grip the dialysing membrane 3 and prevent any movement, so ensuring that the membrane is uniformly disposed.

All the previously described embodiments comprise a first layer 2a and a second layer 2b, disposed mutually facing. Each layer has a base layer 4 made of plastics material, as is the layer itself. To reduce the quantity of plastics material used, the support element may be made in such a manner that it comprises the first layer 2a on one of its faces and the second layer 2b on its other face. In this embodiment there is no change of concept with respect to that previously described, because the dialysing membrane 3 is here supported between the support element disposed in the form of a spiral, and the first layer is present on one turn while the second layer in the form previously described is present on the adjacent turn, so obtaining the same principles of operation but giving a savings of plastics material.

In all the arrangements heretofore described, the pyramidal elements 5 create channels between each layer and the membrane which allow uniform and distributed passage of the dialysing liquid, and at the same time form furrows in the dialyser membrane 3, so facilitating uniform flow of blood inside the dialyser membrane 3.

The blood inlet and outlet ports in the dialyser membrane 3 comprise a connector 30 including a tube 31 which extends perpendicularly and is connected to a header 32. More precisely, the header 32 is located internally, in proximity to one end of the dialyser tubular membrane 3, while the tube 31 passes to the outside of said membrane 3 and is provided with a locking disc 33 fixed either by screwing or by forcing, and which locks the membrane 3 against one wall of the header 32. A washer 34 is preferably located between the locking disc 33 and membrane 3. The header comprises internally a chamber 35 communicating to the interior of the tubular membrane 3, and the purpose of the wall which lies opposite that to which the locking disc 33 is applied is to keep the other side of the tubular membrane spaced apart, to avoid the creation of any obstruction to normal blood flow inside the membrane.

From the description it can be seen that the invention attains all the proposed objects, and in particular it is emphasized that with the embodiments described, by using support layers comprising square-based pyramidal projecting elements, uniform flow distribution both of the blood and the dialysing liquid is obtained, without any danger of blockage, stagnant zones or obstruction of any kind.

The invention so conceived is susceptible to numerous modifications, all of which fall within the scope of the inventive idea.

It will be appreciated that the term "pyramidal projection" as used in this specification should be intended in the sense of a generic projection having a spot-like vertex or apex as distinguished from rib-like projections having a rectilinear summit.

Furthermore all technical details may be replaced by other equivalent elements.

In practice the materials used and the dimensions may be chosen at will according to requirements.

I claim:

1. A dialyser cartridge of roll type particularly for extracorporal artificial kidneys comprising an outer casing, a support element consisting of a length of plastics material sheet spirally wound in said casing and having a longitudinally extending web and at least one type of projections on both sides of the web distributed in aligned arrangement to provide spaces between the projections defining fluid flow passages for the dialysing liquid, the aligned arrangement of said projections on one side of said web defining a first plurality of parallel directional lines and the aligned arrangement of the projections on the other side of said web defining a second plurality of parallel centerlines, a flattened tubular dialyser membrane longitudinally and transversely coextensive with said support element and disposed, along turns thereof between said one side of said support element and said other side of the subsequent turn of said support element and wherein, the improvement consists in that at least part of said first plurality of directional lines is arranged at an angle with respect to said second plurality of directional lines, said first and said second plurality of directional lines crossing each other at least partially and at least part of said projections on one side of said web abutting with the interposition of said membrane against the projections on the other side of the web thereby to prevent embedding of said projections on one side of said web in the spaces between said projections on the other side of said web.

2. A cartridge according to claim 1, wherein said projections on said web sides are pyramidal projections and the spaces between the projections define channels for dialyser liquid flow parallel to said directional lines.

3. A cartridge according to claim 2, wherein said directional lines form an angle of about 45° with longitudinal extension of said web and the plurality of directional lines on one of said web form an angle of about 12° with the plurality of directional lines on the othe side of said web.

4. A cartridge according to claim 3, wherein said projections have the shape of a pyramid with a square base and said directional lines pass through vertices of aligned pyramids.

5. A cartridge according to claim 1, wherein one part of said projections are pyramidal projections and another part of said projections are in the form of elongated rectilinear ribs uniformely distributed in bands extending substantially longitudinally to said web, said plurality of directional lines of said pyramidal projections being parallel to each other on both sides of said web, the rectilinear ribs on one side of said web being at an angle with respect to the ribs on the other side of said web and crossing each other, thereby to prevent said pyramidal projections at one said turns to be embedded in the spaces between the pyramidal projections on the other side of said web at the adjacent turn thereof.

6. A cartridge according to claim 5, wherein said ribs on one side of said web form an angle of about 45° with a longitudinal extension of said web and the ribs on the other side of said web form an opposite angle of about 45° with the longitudinal extension of said web thereby to cross each other.

7. A cartridge according to claim 5, wherein said ribs have a form of an elongated pyramid with a rhomboidal base and having a lateral face projecting perpendicular from said web.

* * * * *